United States Patent

Evans et al.

[15] 3,681,835

[45] Aug. 8, 1972

[54] WIRE MESH JIG BOARD

[72] Inventors: Jerry E. Evans, 216 S. Marguerita, Alhambra, Calif. 91801; Robert A. Evans, 6103 N. De Lay, Glendora, Calif. 91740

[22] Filed: Oct. 12, 1970

[21] Appl. No.: 79,889

[52] U.S. Cl............29/203 J, 29/203 MW, 29/476
[51] Int. Cl. .....H05k 13/04, H05k 3/32, B73k 31/02
[58] Field of Search..........29/203 J, 203 MW, 203 P, 203 R, 29/476

[56] References Cited

UNITED STATES PATENTS 1,836,354   12/1931   Abrams......................29/476

*Primary Examiner*—Thomas H. Eager
*Attorney*—Beehler, Arant & Jagger

[57] ABSTRACT

A wire mesh jig board for preparing electronic assemblies, which includes a generally rectangular steel frame, a pair of rectangular wire mesh screens supported within the frame in spaced parallel relationship, a spacer between the screens for maintaining their spaced relationship, and including a quantity of low-temperature epoxy material bonding the peripheral edges of the screens to the frame.

3 Claims, 7 Drawing Figures

PATENTED AUG 8 1972 3,681,835

JERRY E. EVANS
ROBERT A. EVANS
INVENTORS

BY
Beehler, Arant & Jagger
ATTORNEYS

JERRY E. EVANS,
ROBERT A. EVANS
INVENTORS

BY
Buhler, Arant & Jagger
ATTORNEYS

WIRE MESH JIG BOARD

BACKGROUND OF THE INVENTION

In various manufacturing operations it is necessary to fit a group of electric wires, or other electrical or electronic apparatus, into a mechanical assembly in predetermined space relationships relative thereto. It has been found advantageous to prepare a drawing which shows the location of the wires or other electrical or electronic apparatus in actual size. The drawing is laid out on a table or other supporting medium, the wires and other parts of the electronic assembly are laid out in their respective positions on top of the drawing, and then the various parts of the electronic assembly are tied together so that, mechanically speaking, it constitutes a single package. The electronic assembly is then lifted from the layout drawing and is placed upon the machine or apparatus of which it is to become a part. Making electrical connections to the machine or apparatus is then greatly simplified, because each element of the electronic assembly (or package) which is to be connected to the machine or apparatus is already located in its correct relative position.

It has also been found that the fabrication of the electronic assemblies in the manner described above is greatly facilitated by utilizing a special jig board for supporting the layout drawing. The jig board preferably has numerous small openings spaced around its surface, and it then becomes possible to use pins for fastening each wire or other electronic part in place, simply by passing the pin through a hole in the layout drawing so that it is received in one of the jig board openings. The jig board with its preformed openings may be used again and again, and the layout drawing with pin openings formed at selected locations may also be used again and again, so the process lends itself to high volume production with minimum labor requirement.

More specifically, the jig board method of preparing electronic assemblies is not only effective to greatly reduce the amount of time required to put the assembly together in the first instance, but it has also been found to be a relatively error free type of process, and it has the additional significant advantage that when connecting the electronic assembly to the machine or apparatus the making of the various mechanical connections is greatly facilitated because the correct positions of the various connecting parts of the electronic assembly have already been established at the time the electronic assembly was fastened together into a single assembly or package. Within the past several years the technique has, therefore, come into widespread useage.

One type of jig board utilizes a pair of wire mesh screens which are held in spaced parallel relationship, being separated by a spacer such as a honeycomb panel. This type of jig board is reversible because the pins can be inserted into either side. Furthermore, it becomes convenient to use rather long pins, because each pin passes through a relatively small space in one of the wire mesh screens, then through a relatively large cell in the honeycomb panel, then again through a relatively small space in the other wire mesh screen.

The idea of utilizing a wire mesh jig board was known prior to the present invention, but in actual useage the previously known product was not very satisfactory. There was great difficulty obtaining the desired dimensional tolerances; the wire mesh screens tended to buckle and twist creating various difficulties; and the device at best had a short useful life. According to the present invention a wire mesh jig board is constructed in such a manner that these difficulties have been alleviated.

It is, therefore, the primary object of the present invention to provide a wire mesh jig board which may be manufactured economically by mass production techniques, which is accurate and reliable in useage, and which has a long useful life.

DRAWING SUMMARY

PREFERRED EMBODIMENT

Figure 1:
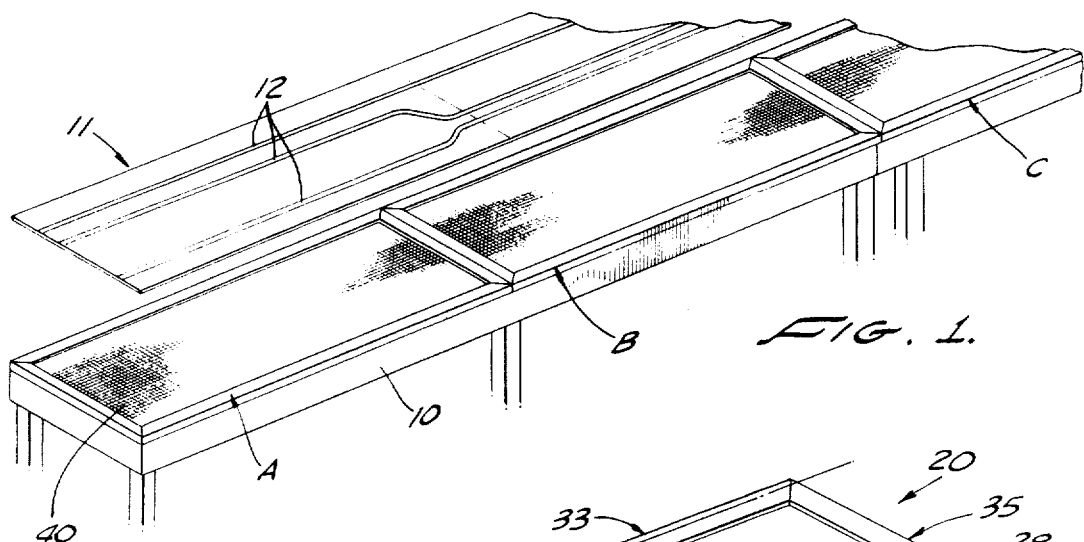
FIG. 1 is a perspective view of wire mesh jig boards in accordance with the invention.

Referring now to FIG. 1, a table 10 supports jig boards A, B, and C in end-to-end relationship. A drawing 11, shown in raised or exploded position, above the jig boards, carries layout lines 12 which represent the desired physical positioning of wires or other electronic components.

Figure 2:
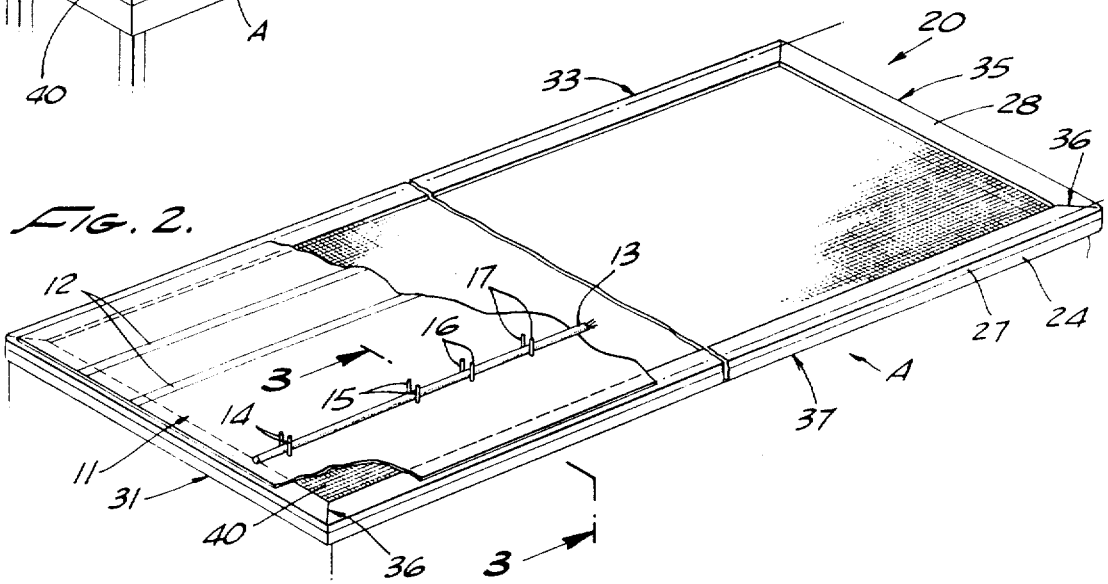
FIG. 2 is a perspective view, partially cut away showing one of the jig boards as it is being used for laying out an electronic assembly.
Figure 3:
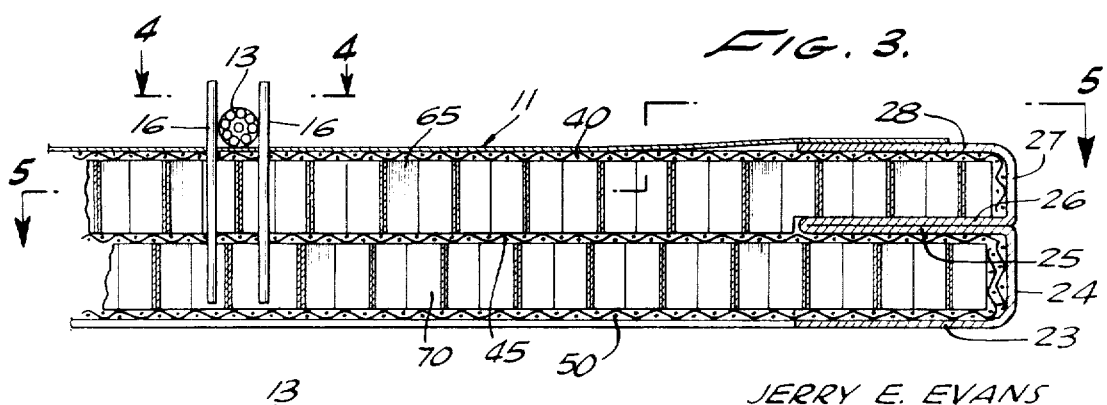
FIG. 3 is a vertical cross-sectional view taken on the line 3—3 of FIG. 2.
Figure 4:
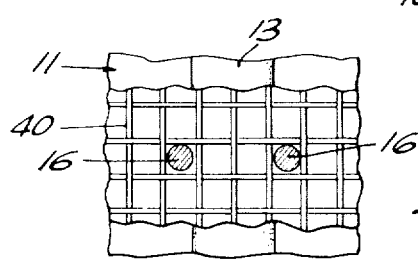
FIG. 4 is a fragmentary horizontal cross-sectional view taken on FIG. 3 between the points 4—4.
Figure 5:
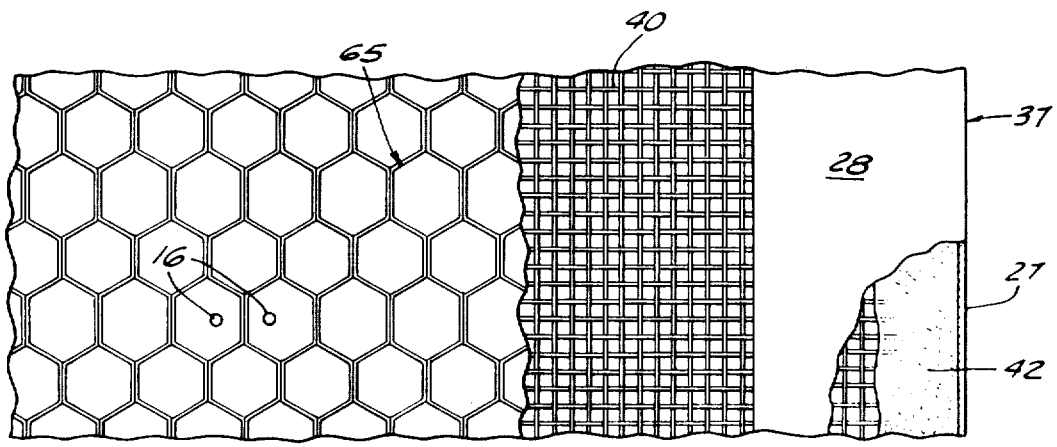
FIG. 5 is a top plan view, partially in cross section, taken on the line 5—5 of FIG. 3.

In FIG. 2 the drawing 11 is shown in its operative position supported upon the upper surface of jig board A. A cable 13 has been laid out on one of the layout lines 12 and is held in position by pin pairs 14, 15, 16, and 17 which are placed on respective sides of the cable 13 at various points throughout its length. FIGS. 3, 4 and 5 show the manner in which the pair of pins 16 are supported by the jig board A so that they may in turn retain the cable 13 in its desired position.

Figure 6:
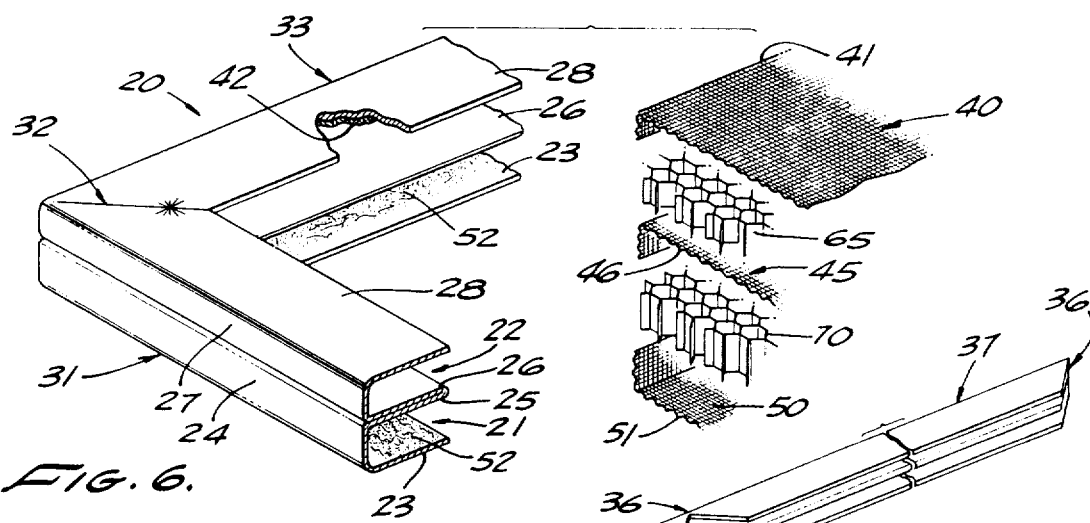
FIG. 6 is an exploded perspective view showing one corner of the frame torn away from its associated screens and spacers.
Figure 7:
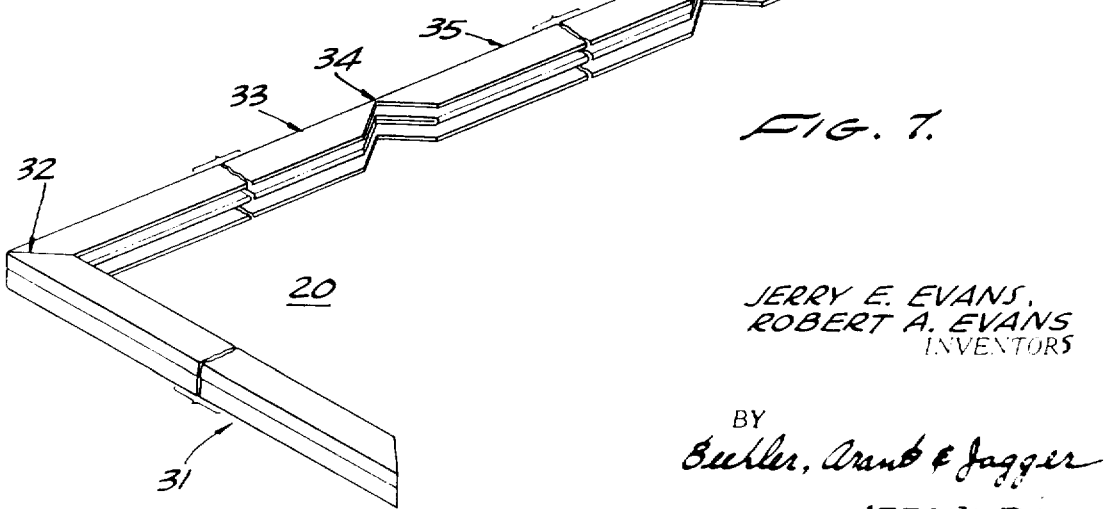
FIG. 7 is a perspective view of the frame showing the manner of its fabrication.

The jig board may in general consist of a pair of wire mesh screens supported in spaced relationship, but it is shown in the present drawings in its preferred form in which three wire mesh screens are utilized. These screens are designated 40, 45, and 50 respectively. A spacer 65 is disposed between the screens 40 and 45 while a spacer 70 is disposed between the screens 45 and 50. This assembly forming a sort of sandwich construction, is held in position by the frame 20. FIG. 6 shows one corner of the fame 20 while FIG. 7 shows the entire frame in the process of fabrication. Frame 20 is preferably formed from a single flat strip of stainless steel which is bent lengthwise into a generally W-shaped configuration, the cross-sectional configuration, the cross-sectional configuration being most clearly seen in FIGS. 3 and 6. The frame member 20, during fabrication is then marked off into an end section 31, a side section 33, another end section 35, and another side section 37, all as shown in FIG. 7. The points between the sections which are to become corners of the frame are notched at 32, 34, and 35, respectively. The remaining ends cut at 45°angle will, when joined, form a corner 36. The bottom wall of the frame remains intact beneath the notches 32, 34, 36, and is then bent so that the frame occupies its desired rectangular configuration, at which time the free ends are welded together to form the corner joint and the formerly notched portions are spotwelded to provide structural strength of the remaining corner joints.

As best seen in FIGS. 3 and 6 the W-shaped configuration of the frame is not symmetrical, and deliberately so. There is a relatively wide channel 21 (see FIG. 6) which opens inwardly of the frame, and there is a relatively narrow channel 22 which also opens inwardly of the frame. The outer wall of the wide channel 21 is designated as 23, its flat bottom wall is designated as 24, and its inner wall is designated as 25. For the narrow channel 22 the inner wall is designated as 26, the bottom wall is 27, and the outer wall is 28. Inner walls 25, 26 are preferably made the same height as outer walls 23, 28, and the inner walls 25, 26 are joined at their apex by virtue of having been formed from a single flat strip of material, as previously explained.

In the completed assembly, as best seen in FIG. 3, the wire mesh screen 40 is disposed within the frame 20, with its peripheral edges disposed within the channel opening 22 (the narrow channel) and engaging the inner surface of the outer side wall 28 of that channel. The wire mesh screen 50 is disposed within the frame 20 with its peripheral edges extending within the channel 21 (the wide channel) and engaging the inner surface of the outer side wall 23. The wire mesh screen 45 is disposed within the frame 20, and its peripheral edges extend within the wide channel 21 and engage the surface of the inner wall 25. The spacers 65, 70 are of equal thickness, hence the distance between the screens 40, 45 is the same as the distance between the screens 45, 50. The eccentricity of the channel 20 is made just sufficient to conform to this relationship.

More specifically, the peripheral edges of screen 40 are designated as 41, the peripheral edges of screen 45 as 46, and the peripheral edges of screen 50 as 51. All of these peripheral edges extend within the corresponding channel of the frame 20, and they are in physical engagement with a respective one of the side walls, as previously described. The position of the screens is maintained by means of low-temperature epoxy which is firmly adhered to interior side wall surfaces of the frame 20 and envelopes at least some portions of the peripheral edges of each of the screens. Thus in FIG. 5 a layer 42 of the low-temperature epoxy material is shown lying between the peripheral edges 41 of screen 40 and the interior surface of wall 28 of the frame. In FIG. 6 a layer 52 of the epoxy material is shown on the interior surface of side wall 23. Another layer 47 (not specifically shown) of the epoxy material is placed on the interior surface of side wall 25 for securing the peripheral edges 46 of screen 45. In FIG. 3 the layers of epoxy material have not been shown because to do so would obscure the relationship of the other parts. A significant advantage of utilizing the low-temperature epoxy material is that when securing the screens to the frame it is not necessary to heat the screens up to such a temperature as to change the mechanical characteristics of the metal wires.

A particular advantage of the W-shaped frame structure is that a reliable, precise structure is economically provided.

The jig board is assembled in such a way that each of the two outer screens remains under tension in two mutually prependicular directions.

MODIFIED FORMS

It will be understood that the device of the present invention may be manufactured utilizing only a pair of wire mesh screens, in which case the frame has a U-shaped configuration rather than the W-shaped configuration as shown.

While honeycomb panels have been shown as the preferred type of spacer, other types of spacers may be used if desired.

The invention has been described in considerable detail in order to comply with patent laws by providing a full public disclosure of at least one of its forms. However, such detailed description is not intended in any way to limit the broad features or principles of the invention, or the scope of patent monopoly to be granted.

Having described the invention, what is claimed as new in support of Letters Patent is:

1. A wire mesh jig board for electronic assemblies, comprising:
    a generally rectangular steel frame having a channel-shaped cross-sectional configuration, with the open top of the channel opening inwardly of the frame;
    a pair of rectangular wire mesh screens disposed in spaced parallel relationship within said frame, each said screen having its peripheral edges disposed within the channel opening of said frame and engaging a corresponding side wall thereof;
    a spacer disposed between said screens for maintaining the spaced relationship thereof, the peripheral edges of said spacer extending into the channel opening of said frame;
    and a layer of low-temperature epoxy firmly adhered to each said side wall of said frame and enveloping at least some portions of the peripheral edges of the corresponding screen for firmly securing the same.

2. A wire mesh jig board as in claim 1 wherein said frame has a generally W-shaped cross-sectional configuration with one channel being wider than the other,
    said pair of screens are disposed within said wider channel,
    and which further includes a third wire mesh screen disposed within the narrower channel in engagement with the outer side wall thereof, and a second spacer lying beneath said third screen,
    the peripheral edges of said third screen also being secured by low-temperature epoxy.

3. A wire mesh jig board as in claim 1 wherein said spacer is a honeycomb panel, and the peripheral edge of at least one of said screens is bent underneath the peripheral edge of said spacer and occupies the bottom portion of said channel.

* * * * *